(12) United States Patent
Ito et al.

(10) Patent No.: US 6,957,532 B2
(45) Date of Patent: Oct. 25, 2005

(54) POWERTRAIN UNIT WITH COMPACT DIPSTICK

(75) Inventors: Katsuhiko Ito, Saitama (JP); Shinya Koyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/821,247

(22) Filed: Apr. 8, 2004

(65) Prior Publication Data

US 2004/0211176 A1    Oct. 28, 2004

(30) Foreign Application Priority Data

Apr. 21, 2003  (JP) ............................. 2003-115390

(51) Int. Cl.[7] .............................................. F16H 39/14
(52) U.S. Cl. ......................................... 60/487; 60/489
(58) Field of Search .......................... 60/328, 487, 489; 33/722

(56) References Cited

U.S. PATENT DOCUMENTS

| | | | | |
|---|---|---|---|---|
| 5,575,151 A | * | 11/1996 | Hayashi et al. | ............... 60/489 |
| 6,324,843 B1 | * | 12/2001 | Yasuda et al. | ................ 60/489 |
| 6,530,218 B2 | * | 3/2003 | Saito et al. | .................... 60/489 |
| 6,698,199 B2 | * | 3/2004 | Hayashi et al. | ............... 60/489 |
| 2003/0079710 A1 | * | 5/2003 | Webster et al. | ......... 123/196 R |

FOREIGN PATENT DOCUMENTS

| | | |
|---|---|---|
| JP | 06002753 | 1/1994 |
| JP | 7-88884 | 9/1995 |
| JP | 2002310061 | 10/2002 |

\* cited by examiner

*Primary Examiner*—Thomas E. Lazo
(74) *Attorney, Agent, or Firm*—Carrier, Blackman & Associates, P.C.; Joseph P. Carrier; William D. Blackman

(57) ABSTRACT

A powertrain unit includes a hydraulic continuously variable transmission including a transmission housing, and a dipstick for checking an oil level in the housing. The width of the powertrain unit is reduced by positioning the dipstick laterally inside the housing. The hydraulic continuously variable transmission includes a fixed-displacement swash plate plunger pump and a variable displacement swash plate plunger motor, which are connected through a closed hydraulic circuit. The outer circumference of a portion of a pump casing of the plunger pump for is reduced in diameter to form a reduced diameter portion. The dipstick is positioned so that a gauge portion thereof extends from an area near the outer circumference of the reduced diameter portion down to the bottom of the transmission housing.

5 Claims, 10 Drawing Sheets

POWERTRAIN UNIT WITH COMPACT DIPSTICK

CROSS-REFERENCE TO RELATED APPLICATIONS

The present invention claims priority under 35 USC 119 based on Japanese patent application No. 2003-115390, filed Apr. 21, 2003.

1. Field of the Invention

The present invention relates to a powertrain unit, with a continuously variable transmission mechanism which includes a swash plate plunger pump connected to a swash plate plunger motor through a closed hydraulic circuit. More particularly, the present invention relates to a powertrain unit including a housing for accommodating the continuously variable transmission, and a dipstick removably mounted in the housing for checking an oil level at the bottom thereof.

2. Description of the Background Art

A number of various types and configurations of hydraulic continuously variable transmissions, including a hydraulic pump and a hydraulic motor, are known in the art, and have been put to practical use.

One example of a hydraulic continuously variable transmission, proposed by the present applicant, is disclosed in Japanese Patent Laid-open No. Hei 6-2753, Japanese Patent Publication No. Hei 7-88884, and Japanese Patent Laid-open No. 2002-310061.

The hydraulic continuously variable transmission disclosed in these patent documents includes a swash plate plunger pump, a swash plate plunger motor, and a closed hydraulic circuit for connecting a discharge port and suction port of the swash plate plunger pump, respectively, to a suction port and discharge port of the swash plate plunger motor. A pump casing, having a pump swash plate member therein, is rotatably driven by an engine. A pump cylinder and a motor cylinder are connected together and fixedly mounted on an output shaft. A motor swash plate member is restricted in rotation, and a motor swash plate angle is variably adjustable.

A vehicle using a powertrain unit having an engine and such a hydraulic continuously variable transmission mechanism integrally connected with the engine has already been developed, manufactured, and marketed by the assignee of the present invention. A hydraulic continuously variable transmission was sold by Honda and marketed under the trademark "Hondamatic" on the 2001 Honda Fourtrax Foreman Rubicon™ TRX500 ATV.

This powertrain unit is configured by integrally connecting a housing to a lower portion of the engine, the housing accommodating a hydraulic continuously variable transmission mechanism and a power transmission mechanism. A bottom space defined in the housing is used as an oil reservoir for storing lubricating oil for the engine, a hydraulic oil for the hydraulic continuously variable transmission mechanism (hydraulic pump and hydraulic motor), and lubricating oil for the power transmission mechanism.

Although certain designs for continuously variable transmissions are known and commercially available, here is still a need in the art for an improved powertrain unit having a continuously variable transmission mechanism. In particular, there is still a need for a compact, narrow powertrain unit having a housing for accommodating the continuously variable transmission mechanism and a dipstick removably mounted on the housing for checking an oil level at the bottom of the housing.

SUMMARY OF THE INVENTION

The present invention relates to an improved powertrain unit including a hydraulic continuously variable transmission. In this powertrain unit, it is necessary to periodically check the level of the oil stored in the bottom space of the housing used as an oil reservoir.

A dipstick, for checking the oil level in the housing, is removably mounted in a side portion of the housing. In mounting the dipstick on the powertrain unit, a gauge portion of the dipstick is required to extend down to the bottom of the housing, but must be arranged so as not to interfere with the hydraulic continuously variable transmission mechanism (hydraulic pump and hydraulic motor) provided in the housing. However, since the hydraulic pump and the hydraulic motor are relatively wide, the dipstick tube has conventionally been positioned laterally outside the housing. As a result, the powertrain unit becomes large in width, causing a size increase.

It is accordingly an object of the present invention to reduce the width of the powertrain unit by minimizing the height of the dipstick tube, and positioning most of the dipstick laterally inside the housing, thereby making the powertrain unit compact.

In accordance with the present invention, a powertrain unit is provided including a continuously variable transmission mechanism for continuously varying the speed of rotation output by a rotational drive force, a housing for accommodating the continuously variable transmission mechanism, and a dipstick, for checking an oil level in the housing, removably mounted in the housing.

The continuously variable transmission mechanism hereof includes a swash plate plunger pump and a swash plate plunger motor connected via a closed hydraulic circuit. One of the swash plate plunger pump and the swash plate plunger motor is of a fixed displacement, and the other is of a variable displacement.

The outer circumference of a casing of the swash plate plunger pump or the swash plate plunger motor is reduced in diameter at a portion for supporting a swash plate, to thereby form a reduced diameter portion. The dipstick is positioned in the housing so that a gauge portion of the dipstick extends from an area near the outer circumference of the reduced diameter portion of the casing down to the bottom of the housing.

Preferably, the powertrain unit further includes an engine integrally connected with an upper portion of the housing, an input power transmission mechanism provided in the housing for transmitting output rotation of the engine to the swash plate plunger pump, and an output power transmission mechanism provided in the housing for transmitting output rotation of the swash plate plunger motor to an output shaft. A multiple-use oil is stored at the bottom of the housing, and is used as a hydraulic oil for the swash plate plunger pump and the swash plate plunger motor, a lubricating oil for the engine, and a lubricating oil for the input and output power transmission mechanisms.

According to the powertrain unit of the present invention as mentioned above, the dipstick is positioned so that the gauge portion thereof extends from an area near the outer circumference of the reduced diameter portion of the casing down to the bottom of the housing. Accordingly, a major portion of the dipstick can be positioned laterally inside the housing, so that the width of the housing can be reduced, along with the width of the powertrain unit.

In the case that the swash plate plunger pump or motor is of a fixed displacement type, it is sufficient for the swash plate to have a size merely allowing the abutment against the outer ends of the plungers. That is, the swash plate has a relatively small diameter. Accordingly, the outer circumference of the casing can be reduced in diameter, at a portion for supporting the swash plate.

In the present invention, the dipstick is positioned so that the gauge portion thereof extends, from an area near the outer circumference of the reduced diameter portion of the pump casing, to the bottom of the housing. As a result, a major portion of the dipstick can be positioned laterally inside the housing, thereby reducing the width of the powertrain unit.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 2:
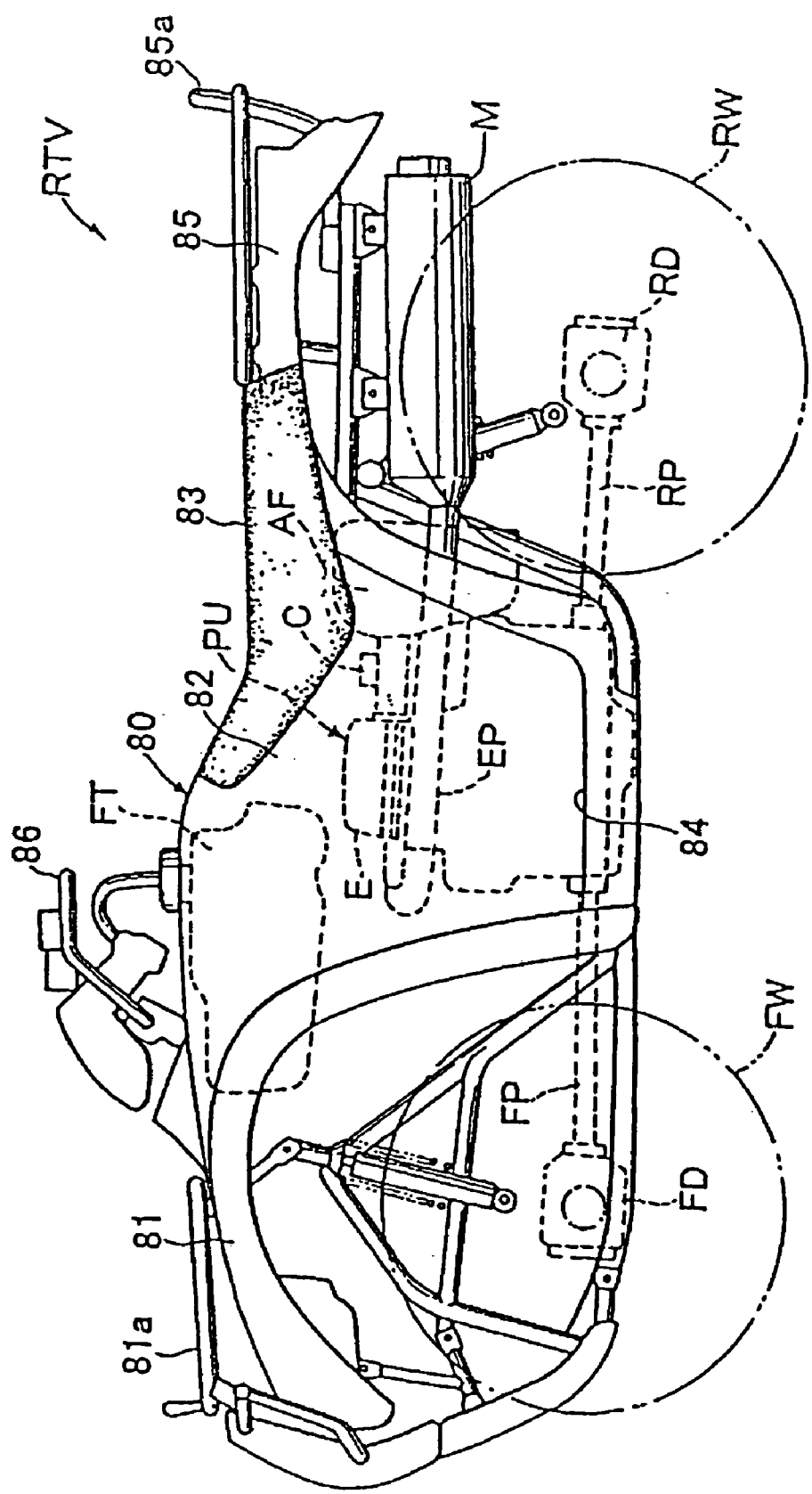
FIG. 2 is a side elevational view of a rough terrain vehicle, having the hydraulic continuously variable transmission of FIG. 1 installed therein.
Figure 3:
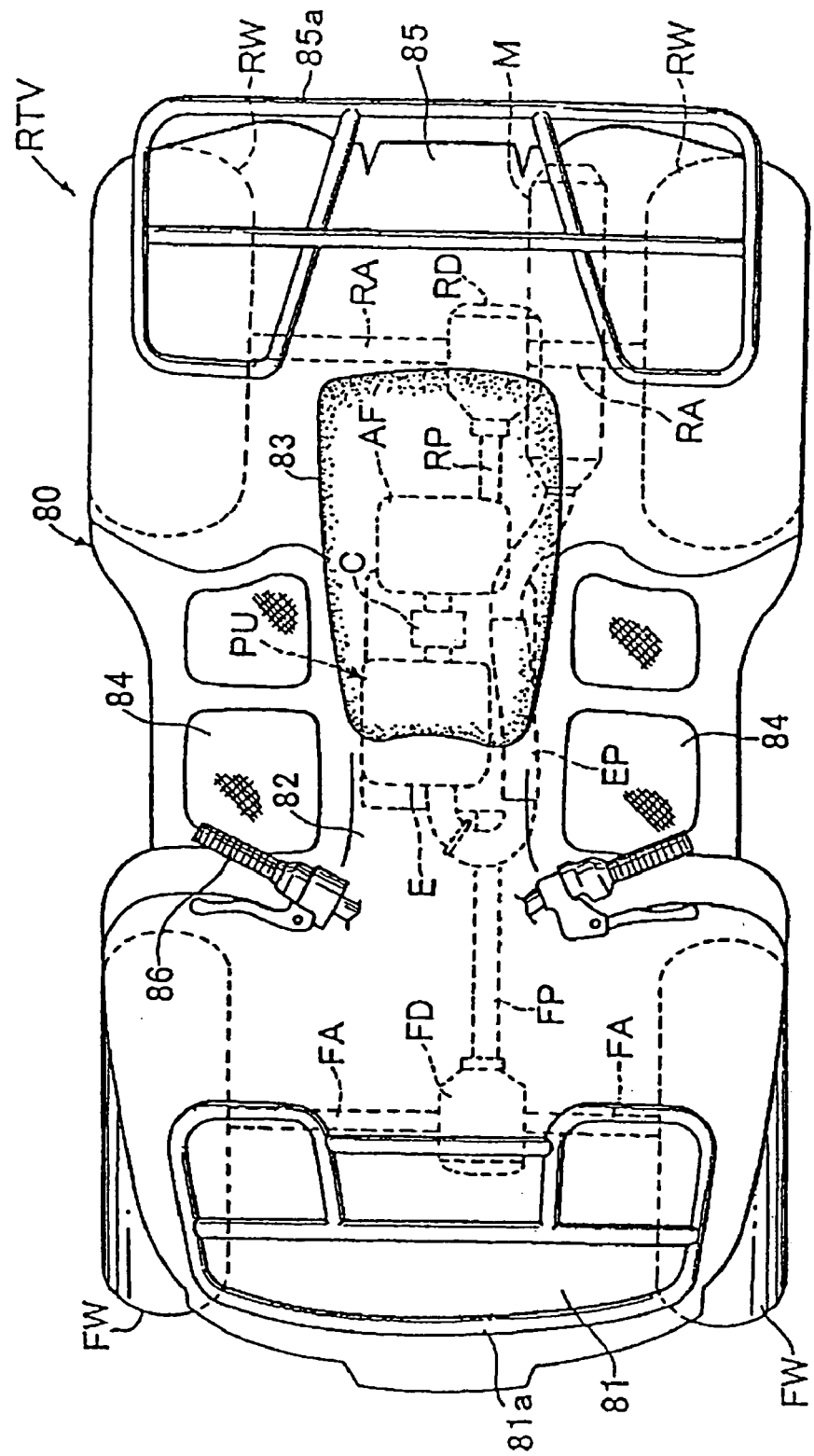
FIG. 3 is a top plan view of the rough terrain vehicle shown in FIG. 2.
Figure 4:
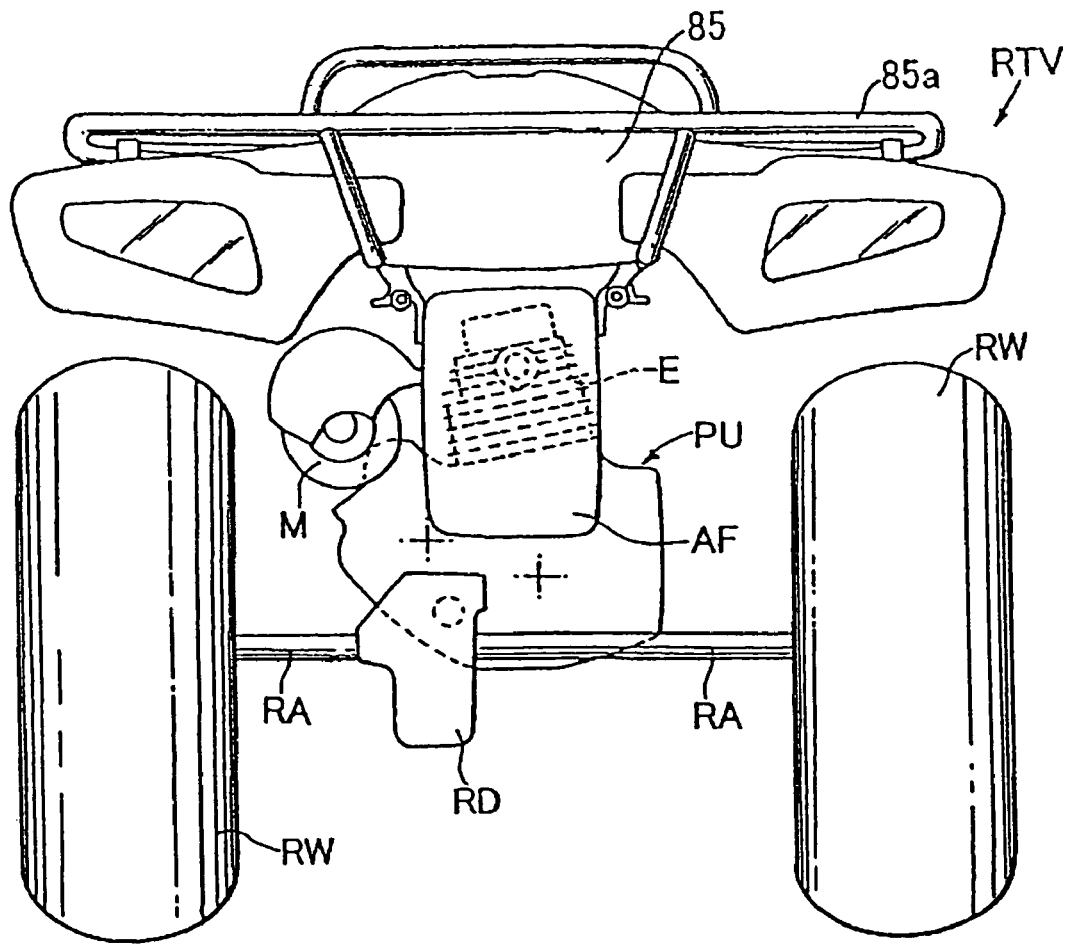
FIG. 4 is a rear elevational view of the rough terrain vehicle of FIG. 2.

An embodiment of the present invention will now be described with reference to the drawings. FIGS. 2 to 4 show a rough terrain vehicle RTV having a powertrain unit PU installed therein, according to according to a selected illustrative embodiment the present invention. The vehicle RTV has a vehicle body 80 including a frame structure therein. The powertrain unit PU is mounted in the vehicle body 80. The vehicle RTV further has a pair of right and left front wheels FW and a pair of right and left rear wheels RW, and an output from the powertrain unit PU is transmitted to the front wheels FW and the rear wheels RW, thereby driving these wheels FW and RW.

The vehicle body 80 includes a front fender portion 81 forming a front portion of the vehicle body and having a front guard 81a, and a saddle portion 82 forming a central portion of the vehicle body so as to project upward and extend longitudinally. The vehicle body 80 also includes a pair of right and left step portions 84 extending laterally from the lower ends of right and left side portions of the saddle portion 82, and a rear fender portion 85 forming a rear portion of the vehicle body and having a rear guard 85a. The saddle portion 82 is provided with a seat 83 to be straddled by the operator of the vehicle RTV.

A steering handle 86 is provided on the front side of the seat 83 so as to be horizontally pivotable for steering the front wheels FW. The steering handle 86 is adapted to be pivotally operated by the operator (not shown) straddling the seat 83 and mounted on the saddle portion 82, in a condition where the operator's feet are supported on the right and left step portions 84. As shown in FIG. 2, a fuel tank FT is provided on the front side of the saddle portion 82.

The powertrain unit PU is provided below the saddle portion 82. As hereinafter described, the powertrain unit PU includes an engine E, a main clutch CL, a hydraulic continuously variable transmission CVT, and a transmission gear train GT.

Outside air, sucked in through an air filter AF, and fuel supplied from the fuel tank FT are mixed in a carburetor C, to thereby produce an air-fuel mixture, which is then drawn into the engine E and burned in the cylinder thereof, to thereby generate a rotational drive force. Exhaust gases produced by the combustion in the engine E are emitted through an exhaust pipe EP and a muffler M.

The rotational drive force of the engine E is transmitted with speed changes from a crankshaft through the main clutch CL, the hydraulic continuously variable transmission CVT, and the transmission gear train GT, and is then output to a front propeller shaft FP and a rear propeller shaft RP.

The front propeller shaft FP is connected to a front differential mechanism FD, and the rotational drive force output to the front propeller shaft FP is transmitted from the front differential mechanism FD through a pair of right and left front axle shafts FA to the right and left front wheels FW, thereby driving the front wheels FW.

Similarly, the rear propeller shaft RP is connected to a rear differential mechanism RD, and the rotational drive force output to the rear propeller shaft RP is transmitted from the rear differential mechanism RD through a pair of right and left rear axle shafts RA to the right and left rear wheels RW, thereby driving the rear wheels RW.

The powertrain unit PU will now be further described with reference to FIG. 5. The powertrain unit PU includes the engine E for generating a rotational drive force, the main clutch CL for performing transmission control of the rotational drive force, the hydraulic continuously variable transmission CVT for continuously varying the speed of output rotation by the rotational drive force transmitted through the main clutch CL, and the transmission gear train GT for performing direction change and transmission of output rotation of the hydraulic continuously variable transmission CVT. The powertrain unit PU is provided inside the saddle portion 82 in such a manner that the crankshaft of the engine E extends longitudinally of the vehicle body.

The engine E has a cylinder 1 having intake and exhaust valves 1a and 1b at a head portion and a piston 2 provided in the cylinder 1. As mentioned above, outside air sucked through the air filter AF and fuel supplied from the fuel tank FT are mixed in the carburetor C to produce an air-fuel mixture. This air-fuel mixture is sucked into the engine 1 by opening the intake valve 1a with a predetermined timing, and then burned in the cylinder 1 to thereby reciprocate the piston 2. The reciprocation of the piston 2 is transmitted through a connecting rod 2a to a crank portion 3a, thereby rotatably driving the crankshaft 3. The main clutch CL is provided at one end of the crankshaft 3. An input drive gear 4 is rotatably mounted on the crankshaft 3, and is connected to, or disconnected from the crankshaft 3 by engagement or disengagement control of the main clutch CL. Accordingly, the rotational drive force of the crankshaft 3 is transmitted to the input drive gear 4 according to the engagement/disengagement control of the main clutch CL. The main clutch CL is provided by a centrifugal clutch, for example.

The hydraulic continuously variable transmission CVT includes a hydraulic swash plate plunger pump P and a hydraulic swash plate plunger motor M. An input driven gear 5, connected to a pump casing of the hydraulic pump P, is in mesh with the input drive gear 4, so that the rotational drive force of the engine E is transmitted to the input driven gear 5, to thereby rotatably drive the pump casing. While the hydraulic continuously variable transmission CVT will be hereinafter described in more detail, the output rotation, continuously varied by the hydraulic continuously variable transmission CVT, is output to a transmission output shaft 6.

A transmission output gear 11 of the transmission gear train GT is fixedly mounted on the transmission output shaft 6, so that rotation of the transmission output shaft 6 is transmitted from the transmission output gear 11 through the transmission gear train GT. The transmission gear train GT has a counter shaft 15 and an idler shaft 13 both parallel to the transmission output shaft 6. A forward gear 12 and a reverse gear 14 are rotatably mounted on the counter shaft 15, and an output drive gear 17 is fixedly mounted on the counter shaft 15. On the other hand, a first idler gear 13a and a second idler gear 13b are fixedly mounted on the idler shaft 13. The forward gear 12 is meshed with the transmission output gear 11, and the first idler gear 13a is also meshed with the transmission output gear 11. The second idler gear 13b is meshed with the reverse gear 14.

The forward gear 12 and the reverse gear 14 are provided with internal clutch gears 12a and 14a, respectively, and a clutch sleeve 16 is mounted on the counter shaft 15 at a portion between the forward gear 12 and the reverse gear 14. The clutch sleeve 16 is rotatable with the counter shaft 15 and is axially movable along the counter shaft 15. An external clutch gear 16a is formed on the outer circumference of the clutch sleeve 16. The external clutch gear 16a is adapted to selectively mesh with the internal clutch gear 12a or 14a by axially moving the clutch sleeve 16. Thus, the external clutch gear 16a and the internal clutch gear 12a or 14a constitutes a dog-tooth clutch. The axial movement of the clutch sleeve 16 is effected according to a shift lever operation to a forward position or a reverse position by the operator.

Figure 5:
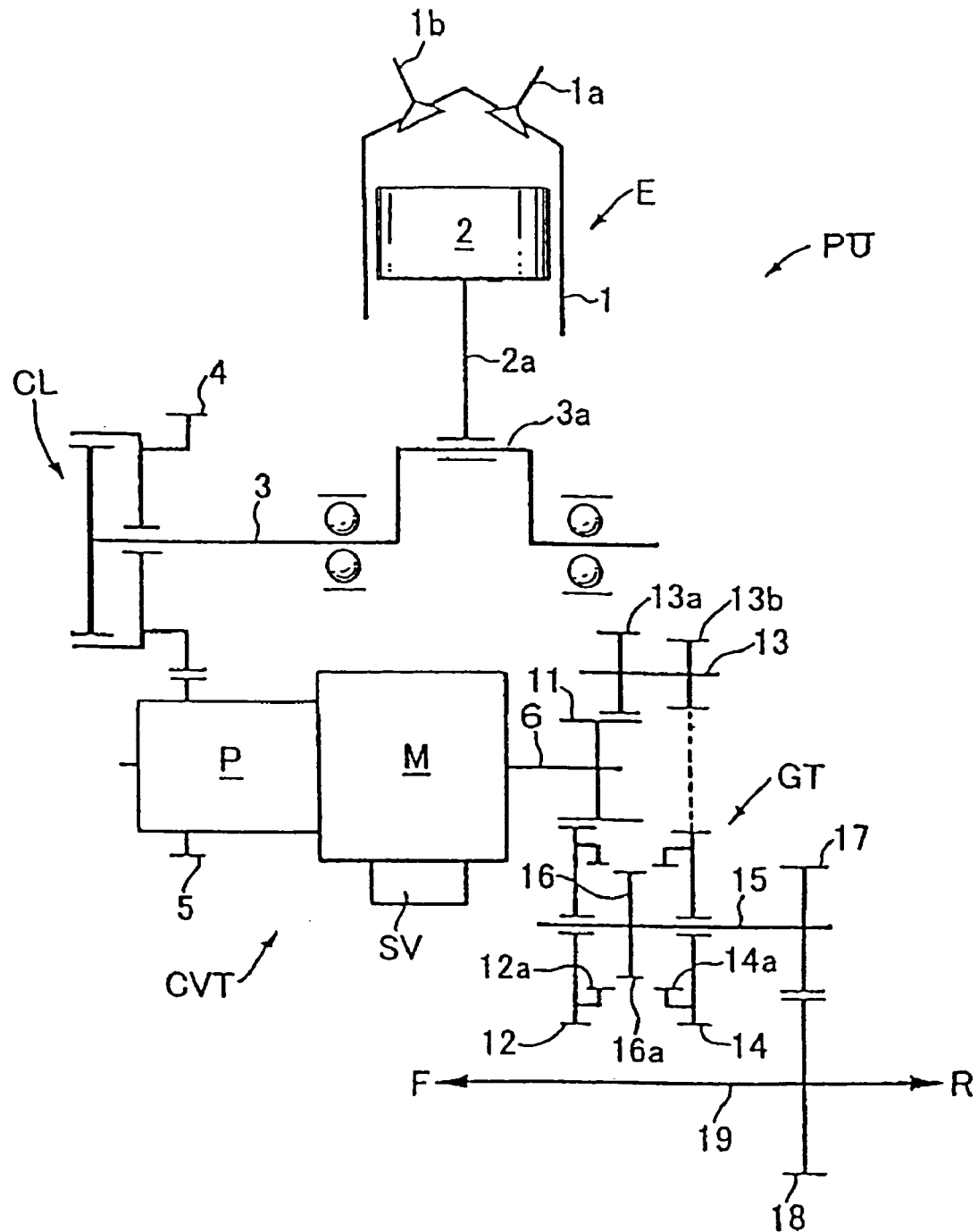
FIG. 5 is a schematic diagram showing a power transmission path in the powertrain unit according to the selected embodiment.
Figure 6:
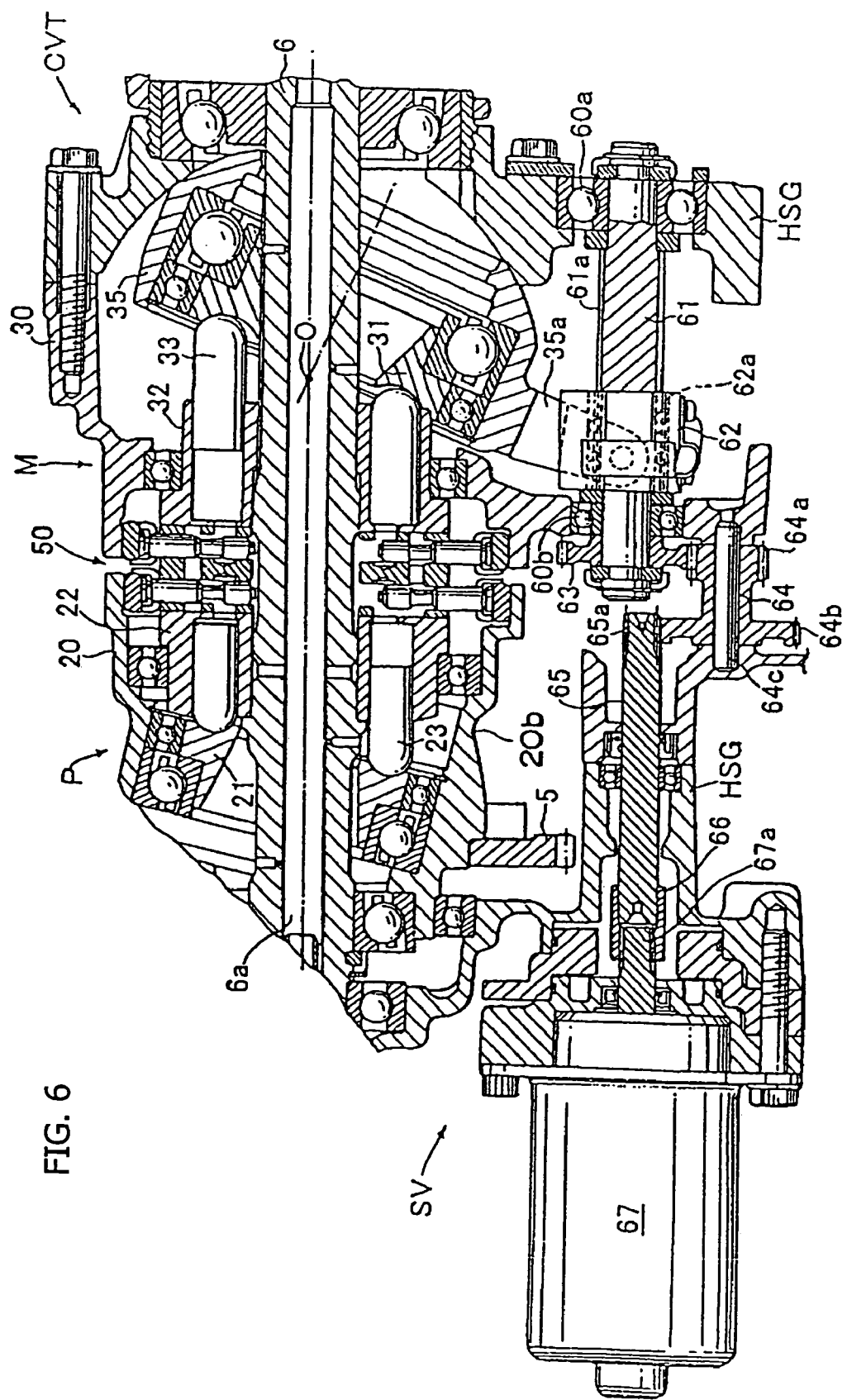
FIG. 6 is a sectional view of the hydraulic continuously variable transmission according to the selected embodiment.

When the operator performs a shift lever operation to a forward position, the clutch sleeve 16 is moved leftward as viewed in FIG. 5 until the external clutch gear 16a meshes with the internal clutch gear 12a to thereby connect the forward gear 12 and the counter shaft 15. Accordingly, rotation of the transmission output gear 11 is transmitted through the forward gear 12 to the counter shaft 15, thereby rotatably driving the output drive gear 17.

In contrast, when the operator performs a shift lever operation to a reverse position, the clutch sleeve 16 is moved rightward as viewed in FIG. 5 until the external clutch gear 16a meshes with the internal clutch gear 14a to thereby connect the reverse gear 14 and the counter shaft 15. In this condition, rotation of the transmission output gear 11 is transmitted from the first idler gear 13a through the idler shaft 13 to the second idler gear 13b, and is further transmitted from the second idler gear 13b through the reverse gear 14 meshing with the gear 13b to the counter shaft 15, thereby rotatably driving the output drive gear 17. In this case, the direction of rotation of the output drive gear 17 is opposite to that in the case of the above shift lever operation to the forward position.

The output drive gear 17 is in mesh with an output driven gear 18 fixedly mounted on a drive shaft 19, so that rotation of the output drive gear 17 is transmitted through the output driven gear 18 to the drive shaft 19. The front end of the drive shaft 19 is connected to the front propeller shaft FP, and the rear end of the drive shaft 19 is connected to the rear propeller shaft RP, so that the rotational drive force transmitted to the drive shaft 19 is transmitted to the front and rear propeller shafts FP and RP, thereby driving the front and rear wheels FW and RW as mentioned above.

The hydraulic continuously variable transmission CVT will now be described in detail with reference to FIGS. 1 and 6 to 8. The hydraulic continuously variable transmission CVT is generally composed of the hydraulic swash plate plunger pump P and the hydraulic swash plate plunger motor M as mentioned above. The transmission output shaft 6 extends through the hydraulic pump P and the hydraulic motor M at their central portions. The transmission output shaft 6 is rotatably supported in a transmission housing HSG by ball bearings 7a and 7b.

The hydraulic pump P includes a pump casing 20 provided coaxially on the transmission output shaft 6 so as to be rotatable relative thereto, a pump swash plate member 21 provided inside the pump casing 20 so as to be inclined a predetermined angle with respect to the axis of rotation of the pump casing 20, and a pump cylinder 22 opposed to the pump swash plate member 21.

The hydraulic pump P also includes a plurality of pump plungers 23 slidably inserted in a plurality of pump plunger holes 22a formed in the pump cylinder 22 so as to extend axially and be arranged annularly about the axis of the pump cylinder 22. The pump casing 20 is rotatably supported on the transmission output shaft 6 by a bearing 8a, and is also rotatably supported in the transmission housing HSG by a bearing 8b. The pump swash plate member 21 is rotatably supported in the pump casing 20 by bearings 21a and 21b, so as to be rotatable about an axis, while inclined at the predetermined angle mentioned above. The pump cylinder 22 is coaxially supported in the pump casing 20 by a bearing 22c so as to be rotatable relative to the pump casing 20.

The hydraulic pump P is a fixed-displacement type swash plate plunger pump. That is, the pump swash plate member 21 has a swash plate surface 21a abutting against the outer ends of the pump plungers 23, and is supported in the pump casing 20 with the swash plate surface 21a inclined a predetermined angle. Accordingly, it is sufficient for the pump swash plate member 21 to have a size merely allowing the abutment against the outer ends of the pump plungers 23 arranged annularly, and an outer circumferential portion of the pump casing 20 supporting the pump swash plate member 21 is reduced in diameter to form a reduced diameter portion 20b.

The input driven gear 5 is fixedly mounted to the outer circumference of the pump casing 20 by tightening a bolt 5a. The outer ends of the pump plungers 23 project from the respective pump plunger holes 22a to abut against the swash plate surface 21a of the pump splash plate member 21, and the inner ends of the pump plungers 23 are disposed inside the respective pump plunger holes 22a so as to be opposed to a valve body 51 of a distribution valve 50 to be hereinafter described, thereby forming a pump oil chamber 23a in each pump plunger hole 22a. Each pump plunger hole 22a has a pump opening 22b functioning as a pump discharge port and a pump suction port.

When the input driven gear 5 is rotatably driven, the pump casing 20 is rotatably driven and the pump swash plate member 21 provided in the pump casing 20 is oscillated in association with the rotation of the pump casing 20, so that the pump plungers 23 are reciprocated inside the respective pump plunger holes 22a according to the oscillation of the swash plate surface 21a to thereby compress or expand the hydraulic oil in the pump oil chambers 23a.

Figure 1:
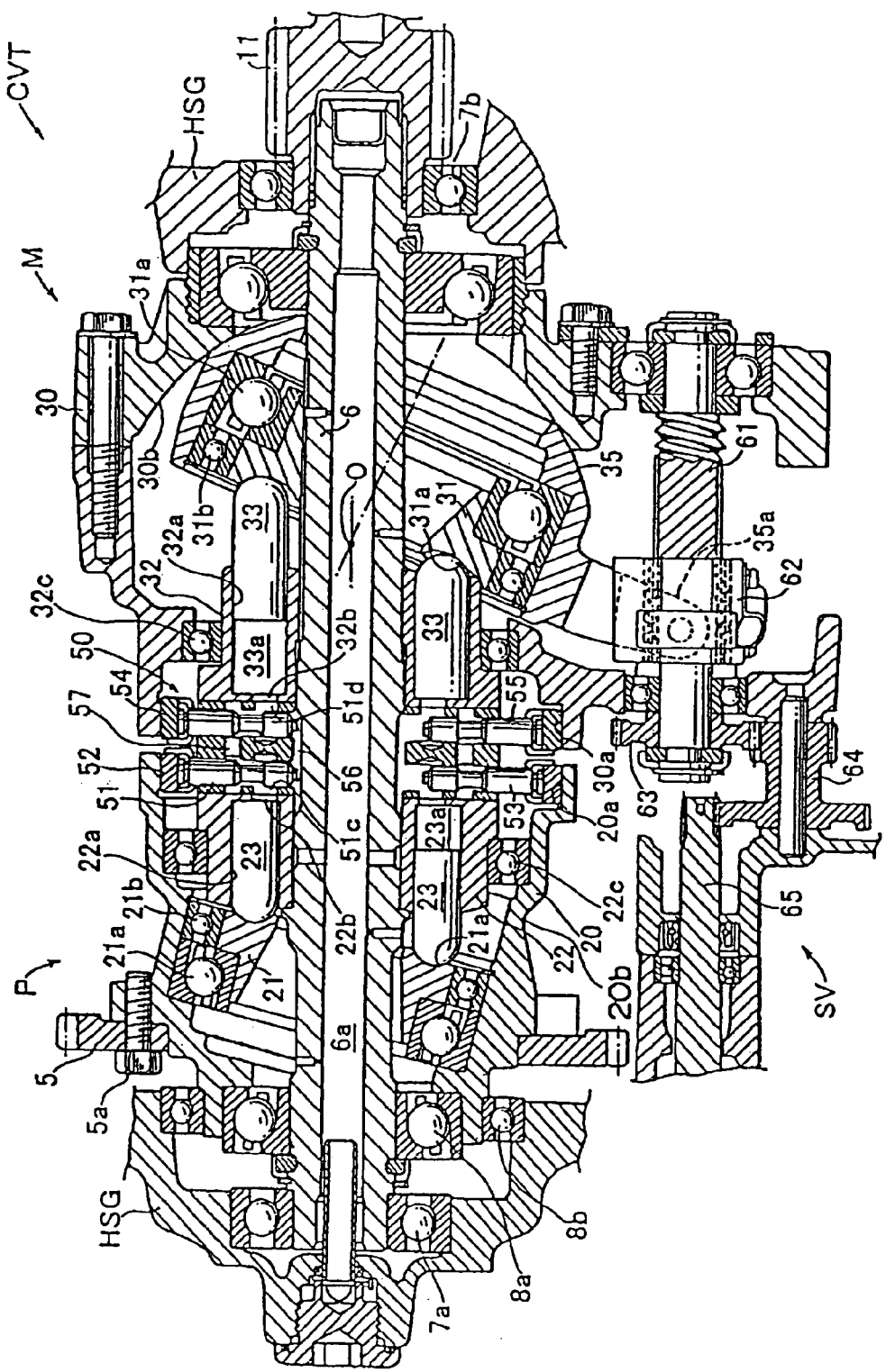
FIG. 1 is a sectional view of a hydraulic continuously variable transmission of a powertrain unit according to a selected illustrative embodiment of the present invention.

The hydraulic motor M includes a motor casing 30 fixed to the transmission housing HSG and a motor pivot member 35, supported in sliding contact with a spherical support surface 30b formed as an inner surface of the motor casing 30, The motor pivot member 35 is pivotally movable about a pivot center O extending in a direction perpendicular to the axis of the transmission output shaft 6 (i.e., in a direction perpendicular to the sheet plane of FIG. 1).

The hydraulic motor M also includes a motor swash plate member 31 rotatably supported in the motor pivot member 35 by bearings 31a and 31b, a motor cylinder 32 opposed to the motor swash plate member 31, and a plurality of motor plungers 33 slidably inserted in a plurality of motor plunger holes 32a formed in the motor cylinder 32 so as to extend axially and be arranged in a cylindrical pattern extending about the axis of the motor cylinder 32. The motor cylinder 32 is rotatably supported in the motor casing 30 at its outer circumference through a bearing 32c.

The outer ends of the motor plungers 33 project from the respective motor plunger holes 32a to abut against the swash plate surface 31a of the motor swash plate member 31, and the inner ends of the motor plungers 33 are disposed inside the respective motor plunger holes 32a so as to be opposed to the valve body 51, thereby forming a motor oil chamber 33a in each motor plunger hole 32a. Each motor plunger hole 32a has a motor opening 32b functioning as a motor discharge port and a motor suction port.

The motor pivot member 35 is formed with an arm portion 35a projecting radially outward from the outer circumference of the member 35. The arm portion 35a of the motor pivot member 35 is connected to a motor servo mechanism SV. The motor servo mechanism SV controls to move the arm portion 35a rightward or leftward as viewed in FIG. 1, thereby pivotally moving the motor pivot member 35 about the pivot center O. When the motor pivot member 35 is pivotally moved as mentioned above, the motor swash plate member 31 rotatably supported inside the motor pivot member 35 is also pivotally moved therewith, so that the swash plate angle of the motor swash plate member 31 is adjustably changed.

The distribution valve 50 is provided between the pump cylinder 22 and the motor cylinder 32. The valve body 51 of the distribution valve 50 is sandwiched between the pump cylinder 22 and the motor cylinder 32 so as to be integrally connected together and be secured to the transmission output shaft 6. Accordingly, it will be understood from the foregoing discussion that the pump cylinder 22, the distribution valve 50, the motor cylinder 32, and the transmission output shaft 6 are rotated concurrently together.

Figure 7:
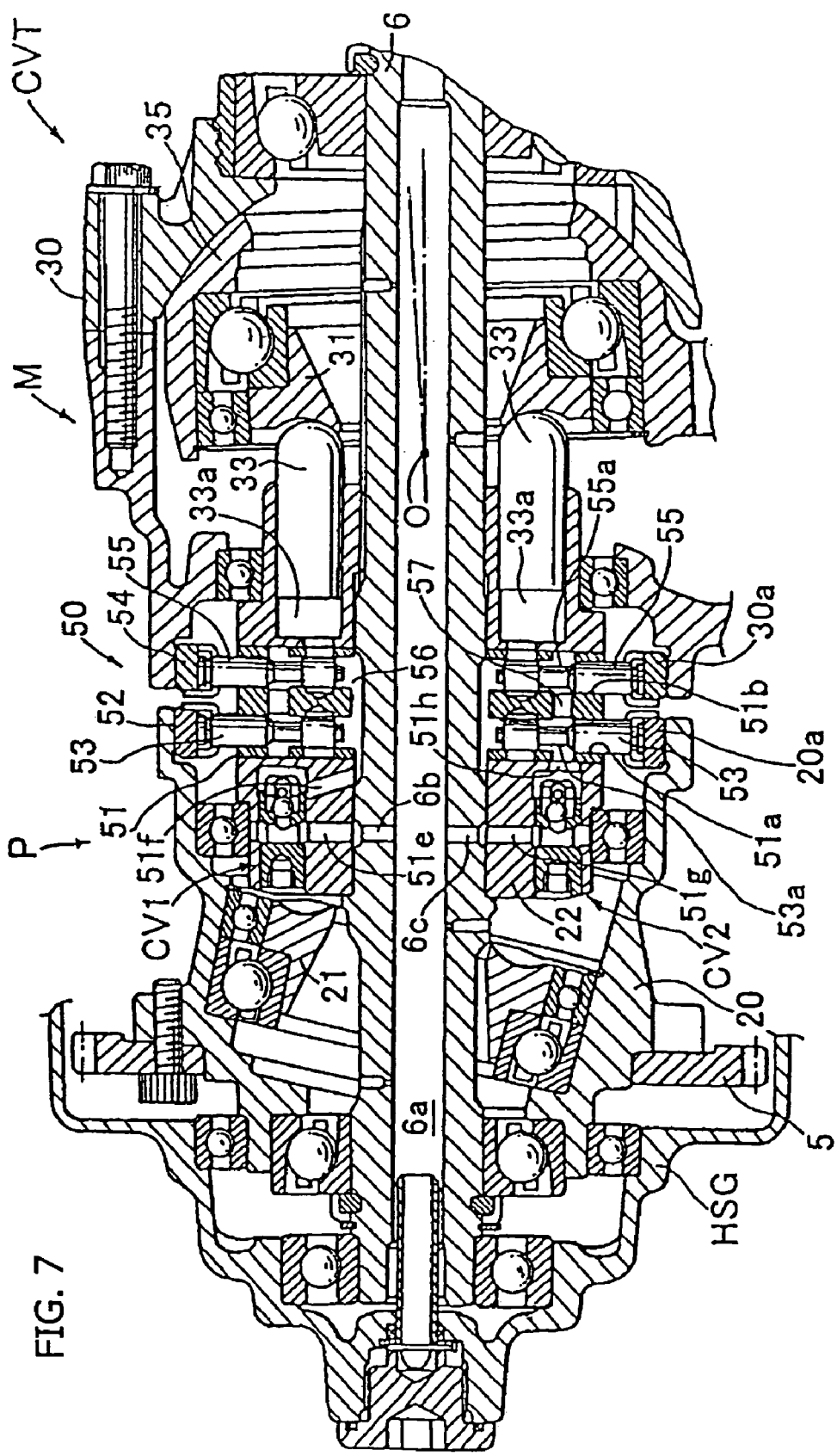
FIG. 7 is a sectional view of the hydraulic continuously variable transmission according to the selected embodiment.

As best shown in FIG. 7, the valve body 51 of the distribution valve 50 is formed with a plurality of pump-side spool holes 51a and a plurality of motor-side spool holes 51b respectively arranged axially in tandem. These spool holes 51a and 51b extend radially and are arranged circumferentially at equal intervals. A pump-side spool 53 is slidably fitted in each pump-side spool hole 51a, and a motor-side spool 55 is slidably fitted in each motor-side spool hole 51b.

The pump-side spool holes 51a are so formed as to respectively correspond to the pump plunger holes 22a, and the valve body 51 is formed with a plurality of pump-side communication passages 51c for making a communication between the pump openings 22b (pump oil chambers 23a) and the pump-side spool holes 51a, respectively. Similarly, the motor-side spool holes 51b are so formed as to respectively correspond to the motor plunger holes 32a, and the valve body 51 is formed with a plurality of motor-side communication passages 51d for making a communication between the motor openings 32b (motor oil chambers 33a) and the motor-side spool holes 51b, respectively (see FIG. 1).

The distribution valve 50 is further provided with a pump-side cam ring 52 surrounding the outer circumferential ends of the pump-side spools 53 and with a motor-side cam ring 54 surrounding the outer circumferential ends of the motor-side spools 55. The inner surface of the pump casing 20 at its axially inner end portion is formed as an eccentric inner circumferential surface 20a eccentric from the axis of rotation of the pump casing 20. The pump-side cam ring 52 is mounted on the eccentric inner circumferential surface 20a and is rotated with the pump casing 20. Similarly, the inner surface of the motor casing 30 at its axially inner end portion is formed as an eccentric inner circumferential surface 30a eccentric from the axis of rotation of the motor cylinder 32. The motor-side cam ring 54 is mounted on the eccentric inner circumferential surface 30a.

The outer circumferential ends of the pump-side spools 53 are relatively rotatably engaged with the inner circumferential surface of the pump-side cam ring 52, and the outer circumferential ends of the motor-side spools 55 are relatively rotatably engaged with the inner circumferential surface of the motor-side cam ring 54.

A radially inner passage 56 is formed between the inner circumferential surface of the valve body 51 and the outer circumferential surface of the transmission output shaft 6, and the pump-side spool holes 51a and the motor-side spool holes 51b communicate at their radially inner ends with the radially inner passage 56. Further, a radially outer passage 57 for making a communication between the pump-side spool holes 51a and the motor-side spool holes 51b is formed in the valve body 51.

The operation of the distribution valve 50 will now be described. When the rotational drive force of the engine E is transmitted to the input driven gear 5 to rotatably drive the pump casing 20, the pump swash plate member 21 is oscillated according to the rotation of the pump casing 20. Accordingly, the pump plungers 23 abutting against the swash plate surface 21a of the pump swash plate member 21 are axially reciprocated inside the pump plunger holes 22a by the oscillation of the pump swash plate member 21. As a result, the hydraulic oil is discharged from the pump oil chambers 23a through the pump openings 22b according to the axially inward movement of the pump plungers 23 (rightward movement as viewed in FIG. 1), and the hydraulic oil is sucked through the pump openings 22b into the pump oil chambers 23a according to the axially outward movement of the pump plungers 23 (leftward movement as viewed in FIG. 1).

At this time, the pump-side cam ring 52 mounted inside the pump casing 20 is rotated with the pump casing 20. Since the pump-side cam ring 52 is eccentric from the axis of rotation of the pump casing 20, the pump-side spools 53 are radially reciprocated inside the pump-side spool holes 51a according to the rotation of the pump-side cam ring 52. When the pump-side spool 53 is moved radially inward as seen from the upper side of the transmission output shaft 6 in FIG. 1, the pump-side communication passage 51c is brought into communication with the radially outer passage 57 through a spool groove 53a, and when the pump-side spool 53 is moved radially outward as seen from the lower side of the transmission output shaft 6 in FIG. 1, the pump-side communication passage 51c is brought into communication with the radially inner passage 56 through the spool groove 53a.

During 180° rotation of the pump casing 20 such that the pump plunger 23 is moved from an outermost projecting position (which will be hereinafter referred to as "bottom dead center") to an innermost depressed position (which will be hereinafter referred to as "top dead center"), the pump-side spool 53 is moved radially inward by the pump-side cam ring 52. Conversely, during 180° rotation of the pump casing 20 such that the pump plunger 23 is moved from the top dead center to the bottom dead center, the pump-side spool 53 is moved radially outward by the pump-side cam ring 52.

As a result, when the pump plunger 53 is moved from the bottom dead center to the top dead center in association with the rotation of the pump casing 20 to discharge the hydraulic oil in the pump oil chamber 23a from the pump opening 22b, this discharged hydraulic oil is fed through the pump-side communication passage 51c to the radially outer passage 57. On the other hand, when the pump plunger 23 is moved from the top dead center to the bottom dead center in association with the rotation of the pump casing 20, the hydraulic oil in the radially inner passage 56 is sucked through the pump-side communication passage 51c and the pump opening 22b into the pump oil chamber 23a. In this manner, when the pump casing 20 is rotatably driven, the hydraulic oil discharged from the hydraulic pump P is supplied to the radially outer passage 57, and the hydraulic oil in the radially inner passage 56 is sucked into the hydraulic pump P.

On the other hand, the motor-side cam ring 54 mounted on the inner surface of the motor casing 30 at its inner end portion is also eccentric from the axis of rotation of the motor cylinder 32. Accordingly, when the motor cylinder 32 is rotated, the motor-side spools 55 are radially reciprocated inside the motor-side spool holes 51b according to the rotation of the motor cylinder 32. When the motor-side spool 55 is moved radially inward as seen from the upper side of the transmission output shaft 6 in FIG. 1, the motor-side communication passage 51d is brought into communication with the radially outer passage 57 through a spool groove 55a, and when the motor-side spool 55 is moved radially outward as seen from the lower side of the transmission output shaft 6 in FIG. 1, the motor-side communication passage 51d is brought into communication with the radially inner passage 56 through the spool groove 55a.

As mentioned above, the hydraulic oil discharged from the hydraulic pump P is fed to the radially outer passage 57, and this hydraulic oil is supplied from the motor-side communication passage 51d through the motor opening 32b into the motor oil chamber 33a, thereby pushing the motor plunger 33 axially outward. The outer end of the motor plunger 33 pushed axially outward slides on the motor swash plate member 31 from a top dead center to a bottom dead center, while the motor pivot member 35 is inclined as shown in FIG. 1. Then, the motor cylinder 32 is rotatably driven, so that the motor plunger 33 is moved from the top dead center to the bottom dead center on the motor swash plate member 31 by the axially outward pushing force.

During 180° rotation of the motor cylinder 32 such that the motor plunger 33 is moved from an outermost projecting position (bottom dead center) to an innermost depressed position (top dead center), the motor-side spool 55 is moved radially outward by the motor-side cam ring 54. Conversely, during 180° rotation of the motor cylinder 32 such that the motor plunger 33 is moved from the top dead center to the bottom dead center, the motor-side spool 55 is moved radially inward by the motor-side cam ring 54.

Thus, in association with the rotation of the motor cylinder 32, the motor plunger 33 is moved from the bottom dead center to the top dead center on the motor swash plate member 31, and simultaneously pushed axially inward. At this time, the hydraulic oil in the motor oil chamber 33a is fed from the motor opening 32b through the motor-side communication passage 51d to the radially inner passage 56. The hydraulic oil thus fed to the radially inner passage 56 is sucked through the pump-side communication passage 51c and the pump opening 22b into the pump oil chamber 23a.

As understood from the above description, when the pump casing 20 is rotatably driven by receiving the rotational drive force of the engine E, the hydraulic oil is discharged from the hydraulic pump P to the radially outer passage 57 and then fed to the hydraulic motor M, thereby rotatably driving the motor cylinder 32. The hydraulic oil having rotated the motor cylinder 32 is fed to the radially inner passage 56 and then sucked into the hydraulic pump P. Thus, a closed hydraulic circuit connecting the hydraulic pump P and the hydraulic motor M is configured by the distribution valve 50. The hydraulic oil discharged from the hydraulic pump P according to the operation of the hydraulic pump P is fed through the closed hydraulic circuit to the hydraulic motor M, thereby rotatably driving the hydraulic motor M. The hydraulic oil having driven the hydraulic motor M and then discharged therefrom is returned through the closed hydraulic circuit to the hydraulic pump P.

The pump cylinder 22 and the motor cylinder 32 are fixed to the transmission output shaft 6, so that they are rotated together. Accordingly, when the motor cylinder 32 is rotatably driven as mentioned above, the pump cylinder 22 is also rotated with the motor cylinder 32, so that a relative rotational speed between the pump casing 20 and the pump cylinder 22 is reduced. Accordingly, the relation between a rotational speed Ni of the pump casing 20 and a rotational speed No of the transmission output shaft 6 (i.e., rotational speed of the pump cylinder 22 and the motor cylinder 32) is given by Eq. (1) in connection with a pump displacement Vp and a motor displacement Vm.

$$Vp \cdot (Ni-No) = Vm \cdot No \qquad (1)$$

The motor displacement Vm can be continuously varied by operating the motor servo mechanism SV to perform the pivoting control of the motor pivot member 35. Accordingly, in the case that the rotational speed Ni of the pump swash plate member 21 is constant, the rotational speed No of the transmission output shaft 6 can be continuously varied by continuously varying the motor displacement Vm.

When the angle of inclination of the motor pivot member 35 is reduced, the motor displacement Vm is reduced. Accordingly, in the case that the pump displacement Vp is constant and the rotational speed Ni of the pump swash plate member 21 is constant in the relation of Eq. (1), the rotational speed No of the transmission output shaft 6 is increased so as to approach the rotational speed Ni of the pump swash plate member 21, that is, continuously variable control to a top speed is performed. Further, when the motor swash plate angle (the angle of inclination of the motor pivot member 35) becomes zero, that is, when the motor pivot member 35 becomes an upright condition, a speed ratio of Ni=No (top speed ratio) is obtained theoretically to become a hydraulic lock condition, so that the pump casing 20 is rotated with the pump cylinder 22, the motor cylinder 32, and the transmission output shaft 6 to effect mechanical power transmission.

As described above, the control of continuously varying the motor displacement is performed by pivotally moving the motor pivot member 35 to variably control the motor swash plate angle. The motor servo mechanism SV for pivotally moving the motor pivot member 35 will now be described mainly with reference to FIG. 6.

The motor servo mechanism SV has a ball screw shaft 61 and a ball nut 62. The ball screw shaft 61 is located in the vicinity of the arm portion 35a of the motor pivot member 35 and extends parallel to the transmission output shaft 6. The ball screw shaft 61 is rotatably supported in the transmission housing HSG by bearings 60a and 60b. The ball nut 62 is threadedly engaged with a male screw 61a formed on the outer circumference of the ball screw shaft 61. A ball female screw 62a is formed on the inner circumference of the ball nut 62 by means of plural balls spirally retained in a cage. This ball female screw 62a is threadedly engaged with the male screw 61a. The ball nut 62 is connected to the arm portion 35a of the motor pivot member 35. When the ball screw shaft 61 is rotatably driven, the ball nut 62 is axially moved along the ball screw shaft 61, so that the motor pivot member 35 is pivotally moved.

The ball screw shaft 61 is rotatably driven by a swash plate control motor (electric motor) 67 mounted on the outer surface of the transmission housing HSG The swash plate control motor 67 has a drive shaft 67a connected through a coupling 66 to a spacer shaft 65. The spacer shaft 65 extends parallel to the transmission output shaft 6 in the transmission housing HSG beyond the outer circumference of the input driven gear 5 to a position near an end portion of the ball screw shaft 61. The spacer shaft 65 is rotatably supported in the transmission housing HSG An idle shaft 64c extending parallel to the spacer shaft 65 is supported in the transmission housing HSG, and an idle gear member 64 is rotatably mounted on the idle shaft 64c.

A first gear 65a is formed at an end portion of the spacer shaft 65 near the ball screw shaft 61. The idle gear member 64 is integrally formed with a second gear 64b and a third gear 64a. The first gear 65a is in mesh with the second gear 64b, and the third gear 64a is in mesh with a fourth gear 63 fixedly mounted on the ball screw shaft 61 at its end portion near the spacer shaft 65. Accordingly, when the swash plate control motor 67 is operated under control to rotate the drive shaft 67a, the rotation of the drive shaft 67a is transmitted through the spacer shaft 65 and the idle gear member 64 to the fourth gear 63, thereby rotatably driving the ball screw shaft 61. As a result, the ball nut 62 is axially moved along the ball screw shaft 61 to thereby pivotally move the motor pivot member 35. Thus, the rotation of the swash plate control motor 67 is transmitted through the idle gear train to the ball screw shaft 61, so that the transmission ratio can be freely changed by suitably setting the gear ratio of the idle gear train.

During the transmission of a hydraulic pressure between the hydraulic pump P and the hydraulic motor M by the flow of oil through the closed hydraulic circuit, oil leakage occurs from the closed hydraulic circuit and from the fitted portions between the pump plunger holes 22a and the pump plungers 23 and between the motor plunger holes 32a and the motor plungers 33. To cope with this oil leakage, the transmission output shaft 6 is formed with an axially extending charge oil supply hole 6a. As shown in FIG. 7, the charge oil supply hole 6a is connected through an oil passage 66 formed in the transmission output shaft 6 and an oil passage 51e formed in the pump cylinder 22 to a first check valve CV1 provided in the pump cylinder 22. The first check valve CV1 is further connected through an oil passage 51f to the radially inner passage 56. Accordingly, a charge oil supplied from a charge oil source (not shown) to the charge oil supply hole 6a is further supplied through the first check valve CV1 to the radially inner passage 56 as required.

The charge oil supply hole 6a is also connected through an oil passage 6c formed in the transmission output shaft 6 and an oil passage 51g formed in the pump cylinder 22 to a second check valve CV2 provided in the pump cylinder 22. The second check valve CV2 is further connected through an oil passage 51h to the radially outer passage 57. Accordingly, the charge oil supplied into the charge oil supply hole 6a is further supplied through the second check valve CV2 to the radially outer passage 57 as required.

As will be understood from the above description of the operation of the hydraulic pump P and the hydraulic motor M, in a normal running condition where the hydraulic oil is supplied from the hydraulic pump P to the hydraulic motor M to rotatably drive the hydraulic motor M, the oil pressure in the radially inner passage 56 is lower than that in the radially outer passage 57, and the charge oil is therefore supplied through the first check valve CV1 to the radially inner passage 56. However, in a running condition where engine brake operation is performed, the oil pressure in the radially outer passage 57 is lower than that in the radially inner passage 56, and the charge oil is therefore supplied through the second check valve CV2 to the radially outer passage 57.

Figure 8:
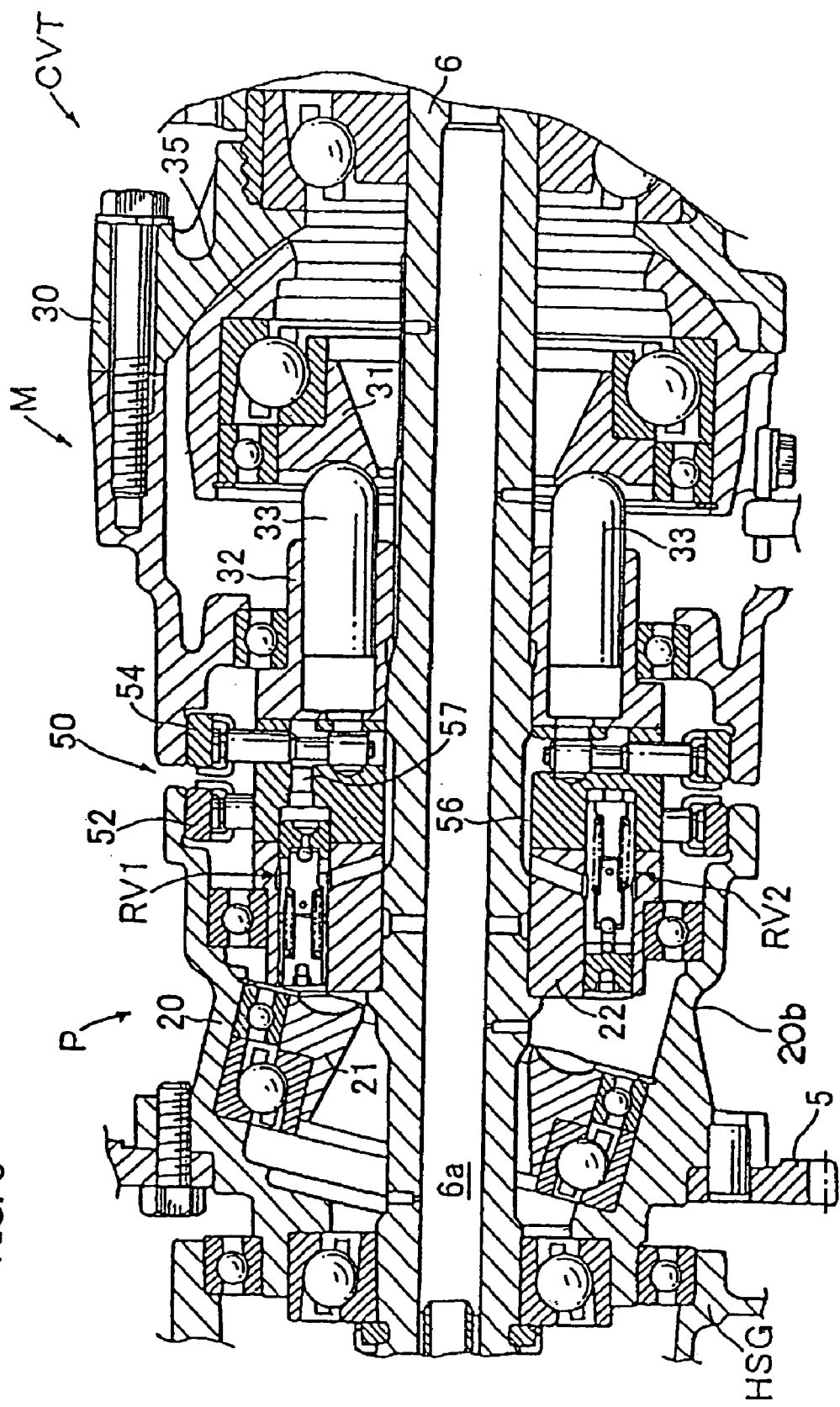
FIG. 8 is a sectional view of the hydraulic continuously variable transmission according to the selected embodiment.

As shown in FIG. 8, first and second relief valves RV1 and RV2 are also provided in the pump cylinder 22. The first relief valve RV1 is provided so as to connect the radially outer passage 57 to the radially inner passage 56. When the oil pressure in the radially outer passage 57 becomes a predetermined pressure or more, the first relief valve RV1 is opened to relieve the oil pressure in the radially outer passage 57 to the radially inner passage 56, thereby preventing an excess increase in oil pressure in the radially outer passage 57. Similarly, the second relief valve RV2 is provided so as to connect the inner passage 56 to the outer passage 57. When the oil pressure in the inner passage 56 becomes a predetermined pressure or more, the second relief valve RV2 is opened to relieve the oil pressure in the inner passage 56 to the outer passage 57, thereby preventing an excess increase in oil pressure in the inner passage 56.

Figure 9:
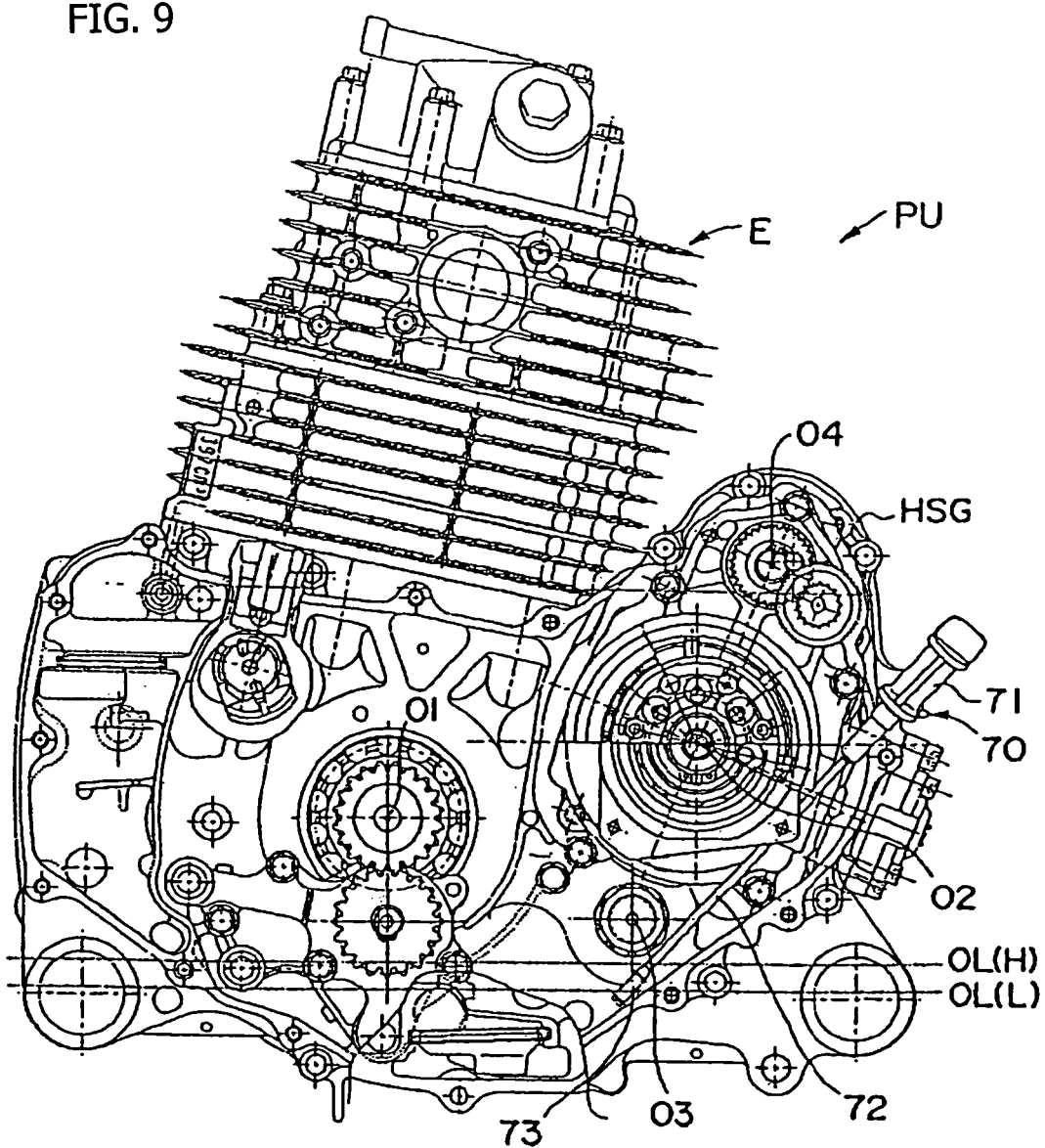
FIG. 9 is a partially sectional, front elevational view of the powertrain unit according to the selected embodiment.

FIG. 9 shows a partially sectional, front elevation of the powertrain unit PU as viewed from the front side of the vehicle. The cylinder block of the engine E projects upward, and the transmission housing HSG is integrally connected to the lower side of the engine E. Further, the hydraulic continuously variable transmission CVT is provided in the transmission housing HSG Reference symbol O1 denotes the axis of rotation of the engine crankshaft, O2 denotes the axis of rotation of the hydraulic continuously variable transmission CVT (i.e., the axis of rotation of the transmission output shaft 6), O3 denotes the axis of rotation of the drive shaft 19 having the output driven gear 18, and O4 denotes the axis of rotation of the swash plate control motor 67 of the motor servo mechanism SV.

In this powertrain unit PU, a multiple-use oil, stored in a bottom space defined at the bottom of the transmission housing HSG, is used as a lubricating oil for the engine E, a hydraulic oil for the hydraulic continuously variable transmission CVT, and a lubricating oil for the internal mechanism (the transmission gear train GT and the motor servo mechanism SV) in the transmission housing HSG The amount of oil stored in this bottom space must be controlled to an appropriate amount. As shown by the double-dot & dash lines in FIG. 9, the bottom space of the transmission housing HSG is set so that the oil level in an engine stop condition as an appropriate oil amount falls between a high level OL(H) and a low level OL(L).

Figure 10:
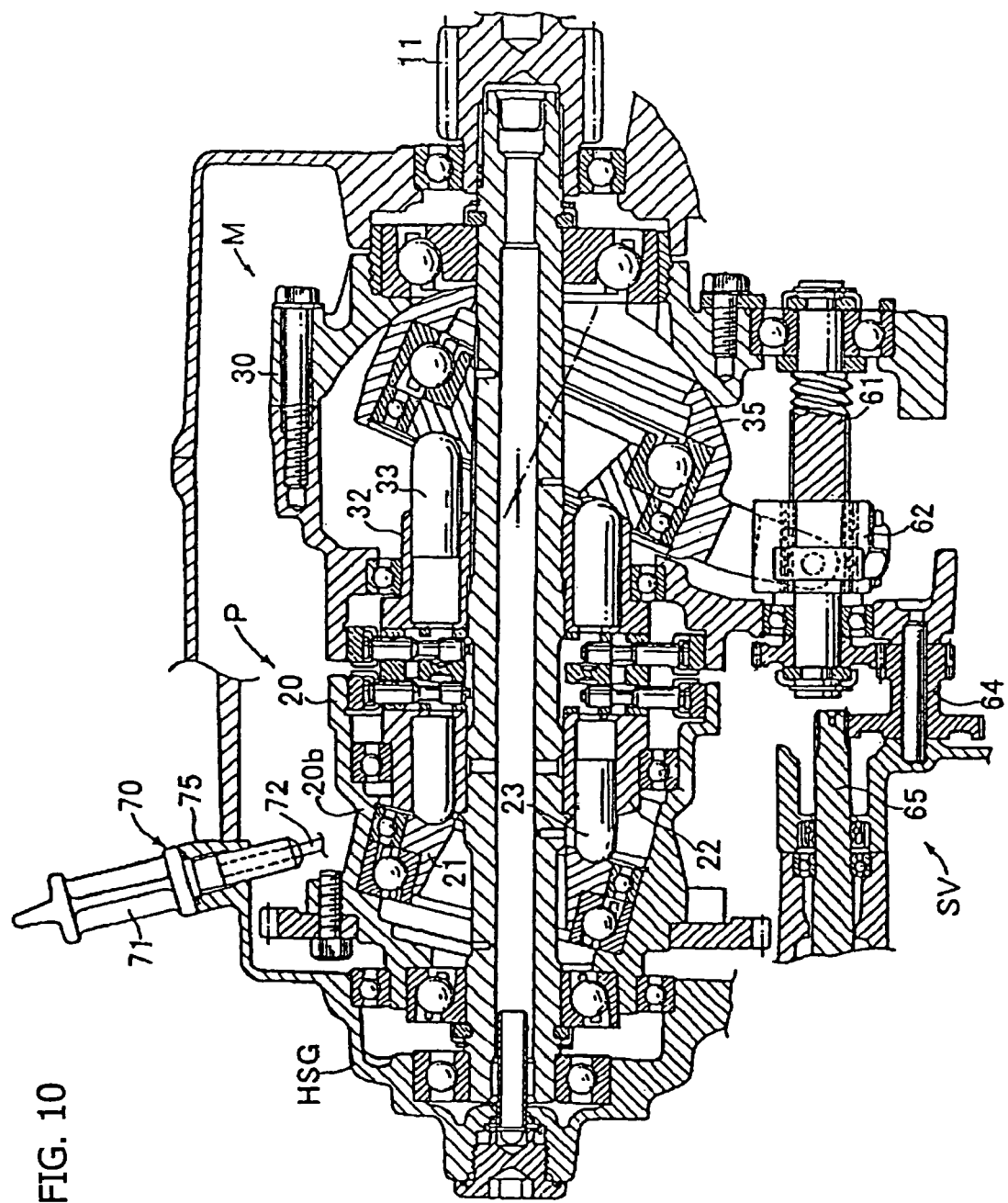
FIG. 10 is a sectional view of the hydraulic continuously variable transmission.

To periodically check whether or not the oil level falls in such an appropriate range, a dipstick 70 is removably mounted on the transmission housing HSG As shown in FIG. 10, the dipstick 70 is removably installed in a dipstick tube 75 formed on the side surface of the transmission housing HSG The dipstick 70 includes an upper handle portion 71 for grasping by a user, and a gauge portion 72 attached to and extending downwardly from the handle portion. The gauge portion 72 is provided at its lower end with an indicator element 73 for indicating an oil level position (see FIG. 9).

In the installed configuration of the dipstick, the gauge portion 72 extends from a mounting hole of the dipstick tube 75 into the transmission housing HSG, and the handle portion 71, extends upwardly from the top of the dipstick tube 75 so as to cover the mounting hole.

It will be seen from FIG. 10 that the distance that the dipstick tube 75 extends outside the housing HSG is less than the length of the handle portion 71 of the dipstick. This short dipstick tube allows for the overall width of the housing HSG to be kept narrow.

The gauge portion 72 is used in the condition where it is always inserted in the transmission housing HSG, except when the vehicle is parked and the dipstick is removed for maintenance. It is therefore necessary that the gauge portion 72 does not interfere with the internal mechanism in the transmission housing HSG As mentioned above, the outer circumference of the pump casing 20 of the hydraulic pump P is partially reduced in diameter at a portion holding the pump swash plate member 21, thereby forming the reduced diameter portion 20b.

The dipstick 70 is mounted on the transmission housing HSG so that the gauge portion 72 thereof extends from an area near the outer circumference of the reduced diameter portion 20b of the pump casing 20 down to the bottom of the transmission housing HSG In this manner, the gauge portion 72 extends from an area near the reduced diameter portion 20b, so that the interference or contact of the gauge portion 72 with the internal mechanism can be avoided. Further, the dipstick 70 can be positioned laterally inside with respect to the width of the transmission housing HSG, so that the width of the transmission housing HSG can be reduced. Accordingly, the overall width of the powertrain unit PU can also be reduced.

As mentioned above, the powertrain unit PU is provided below the saddle portion 82 of the rough terrain vehicle RTV, and the seat 83, mounted on the saddle portion 82, is adapted to be straddled by the operator. Accordingly, by reducing the width of the powertrain unit PU as mentioned above, the width of the saddle portion 82 can be kept narrow, and a difficulty in straddling the seat 83 can therefore be reduced or eliminated.

According to the present invention as described above, the dipstick is positioned so that the gauge portion thereof extends from an area near the outer circumference of the reduced diameter portion of the casing down to the bottom of the housing. Accordingly, the dipstick can be positioned laterally inside with respect to the width of the housing, so that the width of the housing can be reduced to thereby allow a size reduction of the powertrain unit.

Although the present invention has been described herein with respect to a specific illustrative embodiment thereof, the foregoing description is intended to be illustrative, and not restrictive. Those skilled in the art will realize that many modifications of the embodiments could be made which would be operable. All such modifications, which are within the scope of the claims, are intended to be within the scope and spirit of the present invention.

Having thus, described the invention, what is claimed is:

1. A powertrain unit, comprising a continuously variable transmission mechanism for continuously varying a speed of rotation output by a rotational drive force, a housing for accommodating said continuously variable transmission mechanism, and a dipstick removably mounted in said housing for checking an oil level therein;

said continuously variable transmission mechanism comprising a swash plate plunger pump, a swash plate plunger motor and a closed hydraulic circuit connecting said pump and said motor, one of said swash plate plunger pump and said swash plate plunger motor being of a fixed displacement and the other being of a variable displacement;

wherein the outer circumference of a casing of said one of said swash plate plunger pump and said swash plate plunger motor comprises a reduced diameter swash plate supporting portion;

wherein said dipstick comprises a handle portion and a gauge portion attached to and extending away from said handle portion, and wherein said gauge portion of said dipstick extends within said housing from an area near the outer circumference of said reduced diameter swash plate supporting portion down to the bottom of said housing.

2. A powertrain unit according to claim 1, further comprising an engine integrally connected with an upper portion of said housing, an input power transmission mechanism provided in said housing for transmitting output rotation of said engine to said swash plate plunger pump, and an output power transmission mechanism provided in said housing for transmitting output rotation of said swash plate plunger motor to an output shaft;

wherein a multi-use oil to is stored at the bottom of said housing, and wherein said multi-use oil is usable as a hydraulic oil for said swash plate plunger pump and said swash plate plunger motor, as a lubricating oil for said engine, and also as a lubricating oil for said input and output power transmission mechanisms.

3. The powertrain unit of claim 1, wherein the housing comprises a dipstick tube on a surface thereof for receiving the dipstick; wherein the dipstick is removably mounted in the dipstick tube; and wherein the dipstick tube extends outside the housing by a distance which is less than the length of the handle portion of the dipstick.

4. A powertrain unit, comprising a continuously variable transmission mechanism for continuously varying a speed of rotation output by a rotational drive force, a housing for accommodating said continuously variable transmission mechanism, and a dipstick removably mounted in said housing for checking an oil level therein;

wherein said continuously variable transmission mechanism comprises a swash plate plunger pump having a casing with a reduced diameter swash plate supporting portion;

wherein said dipstick comprises a handle portion and a gauge portion attached to and extending away from said handle portion, and wherein said gauge portion of said dipstick extends within said housing from an area near the said reduced diameter swash plate supporting portion of said pump casing down to the bottom of said housing.

5. The powertrain unit of claim 1, wherein the housing comprises a dipstick tube on a surface thereof for receiving the dipstick; wherein the dipstick is removably mounted in the dipstick tube; and wherein the dipstick tube extends outside the housing by a distance which is less than the length of the handle portion of the dipstick.

\* \* \* \* \*